(12) United States Patent
Rochford et al.

(10) Patent No.: US 8,471,660 B2
(45) Date of Patent: Jun. 25, 2013

(54) ASSEMBLY FOR MAGNETIZATION OF RARE-EARTH PERMANENT MAGNETS

(71) Applicant: General Electric Company, Schenectady, NY (US)

(72) Inventors: James Humphrie Rochford, Niskayuna, NY (US); Kiruba Sivasubramaniam Haran, Clifton Park, NY (US); Ernst Wolfgang Stautner, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/705,697

(22) Filed: Dec. 5, 2012

(65) Prior Publication Data

US 2013/0093546 A1   Apr. 18, 2013

Related U.S. Application Data

(62) Division of application No. 13/007,382, filed on Jan. 14, 2011, now Pat. No. 8,362,863.

(51) Int. Cl.
*H01F 13/00* (2006.01)
*H01F 7/20* (2006.01)

(52) U.S. Cl.
USPC ........... 335/284; 335/216; 335/296; 335/300; 310/156.01; 505/876; 505/879

(58) Field of Classification Search
USPC ................. 335/284, 216, 296–297, 300–301; 310/52–54, 156.01; 505/876–879, 880; 361/143
See application file for complete search history.

(56) References Cited

U.S. PATENT DOCUMENTS

| | | | |
|---|---|---|---|
| 3,416,111 | A | 12/1968 | Bogner |
| 4,151,498 | A | 4/1979 | Katsurai |
| 4,156,623 | A | 5/1979 | Becker |
| 4,354,218 | A | 10/1982 | Steingroever et al. |
| 5,111,173 | A | 5/1992 | Matsuda et al. |
| 5,113,163 | A | 5/1992 | Leupold |
| 5,204,569 | A | 4/1993 | Hino et al. |
| 6,441,710 | B1 | 8/2002 | Yanagi et al. |
| 6,507,259 | B2 | 1/2003 | Westphal et al. |
| 6,885,267 | B2 | 4/2005 | Kuriyama et al. |
| 7,119,644 | B2 | 10/2006 | Snitchler et al. |
| 7,609,139 | B2 | 10/2009 | Bird et al. |

(Continued)

OTHER PUBLICATIONS

Coombs et al. "The Next Generation of Superconducting Permanent Magnets: The Flux Pumping Method", IEEE Transactions on Applied Superconductivity, vol. 19, No. 3, Jun. 2009. pp. 2169-2173.

*Primary Examiner* — Mohamad Musleh
(74) *Attorney, Agent, or Firm* — Ann M. Agosti (57) ABSTRACT

A superconducting magnetizer assembly includes a coil pack including an inner coil configured to generate a first magnetic field in response to an electric current supplied to the inner coil, an outer coil being disposed about the inner coil and configured to generate a second magnetic field in response to an electric current supplied to the outer coil, a non-conductive end spacer disposed between an end winding of the inner coil and an end winding of the outer coil, and a container to house the inner and outer coils; and a yoke disposed proximate the coil pack being configured to constrain the first and second magnetic fields to reduce the strength of the first field at the end winding of the inner coil, wherein the yoke comprises an annular ring configured to at least partially envelop the coil pack.

9 Claims, 7 Drawing Sheets

U.S. PATENT DOCUMENTS

| | | |
|---|---|---|
| 8,058,764 B2 | 11/2011 | Wiezoreck |
| 8,258,906 B2 | 9/2012 | Sivasubramaniam et al. |
| 2005/0195058 A1 | 9/2005 | Maurer et al. |
| 2007/0159281 A1 | 7/2007 | Li et al. |
| 2007/0171014 A1 | 7/2007 | Iwasa et al. |
| 2007/0242406 A1 | 10/2007 | Annis et al. |
| 2011/0006865 A1 | 1/2011 | Hemmelmann et al. |
| 2011/0133871 A1 | 6/2011 | Stautner et al. |
| 2011/0301038 A1 | 12/2011 | Stautner et al. |

ASSEMBLY FOR MAGNETIZATION OF RARE-EARTH PERMANENT MAGNETS

BACKGROUND OF THE INVENTION

The subject matter disclosed herein relates to the magnetization of permanent magnets, and more specifically, to the magnetization of magnets disposed within cylindrical structures using one or more superconducting materials.

Many electrical machines include one or more electric motors. Such electric motors typically include a rotor having permanent magnets disposed within the bulk of the rotor. During rotation, the rotor, having the permanent magnets, produces a rotating magnetic field that interacts with a stator. This electromagnetic interaction results in the conversion of electromagnetic energy into mechanical motion that drives the machine.

Two approaches are typically used for the assembly of rotors having permanent magnets. In one approach, shaped materials are magnetized to generate the permanent magnets before they are disposed within the bulk of the rotor. This approach may present several drawbacks. For instance, fully magnetized permanent magnet pieces can be subject to electromagnetic interaction with any surrounding objects, such as other adjacent or proximate magnets, which in turn adds to the complexity of their handling procedures and insertion into the rotor. In a second approach, the shaped materials are first disposed within the rotor and a magnetizer is used to magnetize the permanent magnets. Such an approach is typically referred to as an in-situ magnetization process.

The second approach can also present several drawbacks. To name a few, the energy and fabrication costs for conventional resistive magnetizers capable of generating a sufficient magnetic field flux for the magnetization process can be prohibitive. For example, some in-situ magnetizers are able to produce small magnetic fields sufficient only to magnetize small permanent magnets made of certain materials or grades (e.g., alnico and ferrite) that have low intrinsic coercivity (i.e., materials that can be easily demagnetized). However, many emerging applications for permanent magnet electric machines, such as wind turbine applications, or traction (e.g., magnetic bearing and braking) applications, would benefit from the use of high-coercivity rare-earth permanent magnet materials, which can often require strong magnetic fields. Moreover, as the permanent magnets increase in size, their magnetization becomes increasingly difficult due to inadequate field penetration produced by typical magnetizers. It should therefore be appreciated that due to physical constraints in addition to economic considerations, the in-situ magnetization of such materials is typically very difficult to deliver with conventional restive systems. Accordingly, it is now recognized that a need exists for a magnetizer capable of magnetizing rare-earth, high-coercivity materials in an efficient manner.

BRIEF DESCRIPTION OF THE INVENTION

The present embodiments are generally directed towards such magnetization. In one embodiment, a superconducting magnetizer assembly is provided. The assembly includes a coil pack having an inner coil including a first superconducting magnet material, the coil being configured to generate a first magnetic field in response to an electric current supplied to the coil, and an outer coil including a second superconducting magnet material, the outer coil being disposed about the inner coil and being configured to generate a second magnetic field in response to an electric current supplied to the outer coil. The coil pack also includes a container configured to house the inner and the outer coils.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
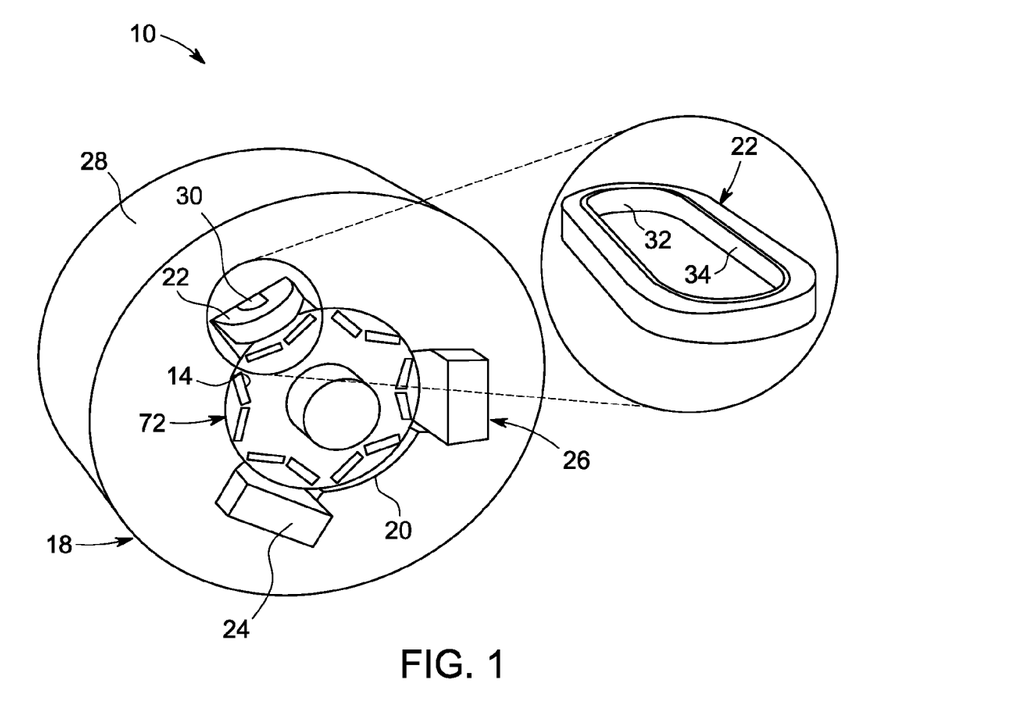
FIG. 1 is an embodiment of an assembly having a superconducting magnetizer assembly and a rotor disposed within the magnetizer assembly, the magnetizer assembly including a plurality of superconducting coils configured to magnetize permanent magnet blocks within the rotor.

The present disclosure is generally directed towards improved systems and methods for the magnetization of materials disposed within a bulk material, such as the magnetization of as-formed permanent magnets disposed within an electric motor rotor. In accordance with the disclosed embodiments, one or more superconducting materials may be utilized to perform the in-situ magnetization of the as-formed permanent magnets. Moreover, the superconducting materials may be disposed in specially configured packs so as to facilitate the magnetization of the as-formed permanent magnets in a non-cubic shaped matrix, such as within the cylindrical rotor described above. Moreover, embodiments of magnetizer assemblies having features for controlling the magnetic fields generated by the superconducting materials are disclosed. Accordingly, to facilitate discussion of the present approaches towards such improved embodiments, FIG. 1 illustrates an assembly 10 including a rotor 12 having as-formed permanent magnets 14 (e.g., rare-earth magnets such as neodymium magnets) disposed within a bulk 16 (e.g., laminations) of the rotor 12. In one embodiment, the permanent magnets 14 may be NdFeB magnets. The rotor 12 is disposed inside of a superconducting magnetizer assembly 18 having an annular opening 20 configured to receive the rotor 12. In some embodiments, the superconducting magnetizer assembly 18 may support at least a portion of the weight of the rotor 12 as the magnetization process is performed.

In a general sense, the superconducting magnetizer assembly 18 includes a set of superconducting coils 22 wound in a racetrack-like manner. Such a configuration, as referred to herein, may be racetrack coils 22. The racetrack coils 22, as noted above, may incorporate a number of superconducting materials, for example niobium-3 tin ($Nb_3Sn$), niobium-titanium (NbTi), $MgB_2$ magnesium diboride, vanadium gallium ($V_3Ga$), YBCo, or combinations thereof in one or more coils such as an inner coil and an outer coil, as will be discussed in further detail below. In the illustrated embodiment, and in the embodiments described below with respect to FIGS. 2-15, the coils 22 are NbTi coils. However, it should be noted that the superconductor material or materials chosen may be application specific and may contain a High Temperature Superconducting or Low Temperature Superconducting material, or both. Generally, the racetrack coils 22 produce a magnetic field when a current is passed through the coils. In some embodiments, the materials mentioned above that form the racetrack coils 22 exhibit decreased resistance when cooled. Accordingly, in such embodiments the racetrack coils 22 may be cooled so as to produce maximum magnetic flux.

Using cooling agents such as liquid helium, it may be possible to approach absolute zero in temperature (i.e., 0 Kelvin (K)), for example, below about 40 K. In one embodiment, liquid helium, which has a temperature of approximately 4 K, may be used as the active coolant to maintain the temperature of the racetrack coils 22 at the temperature of the liquid helium. It will therefore be appreciated that each of the racetrack coils 22 may be disposed in a cryostat 24, which may include other features such as thermal transfer agents (e.g., thermally conductive rods, heat pipes, thermal buses). Together, the racetrack coils 22 and the cryostats 24 each form coil packs 26.

Because the racetrack coils 22 are formed from superconducting materials, such as NbTi and/or $Nb_3Sn$, which are capable of handling very high current densities, thermal dissipation may be reduced compared to conventional resistive magnetizers. That is, in conventional resistive magnetizers, the system must be pulsed to attain the required field levels for short periods of time. For instance, magnetizers incorporating superconducting coils may be energized and de-energized at much slower speeds, such as at ramp rates of ~1 Tesla per minute, compared to conventional magnetizers incorporating conventional resistive coils, which need to be energized and de-energized at ramp rates of ~1 Tesla per second. It should be noted that such ramp rates may be achieved with power supplies much smaller than those required for conventional magnetizers.

In the illustrated embodiment of FIG. 1, the superconducting magnetizer assembly also includes a yoke 28, which may be made from iron, permendur, or similar materials, or any combination thereof. The yoke 28 is generally configured to improve efficiency of the magnetization process by reducing fringe magnetic fields and balancing radial forces produced by the coils 22. In the illustrated embodiment, the yoke 28 includes a plurality of openings 30 configured to house each of the coil packs 26. In this embodiment the rotor 12 includes six pairs of permanent magnets 14 or "poles," and the superconducting magnetizer assembly includes three coil packs 26 each configured to magnetize a pair of permanent magnets 14.

Therefore, in the depicted embodiment, at least two operations must be performed so as to magnetize the rotor 12. For example, an embodiment of such a process may include energizing the racetrack coils 22 so as to magnetize the permanent magnets 14 adjacent to their respective coil packs 26, followed by a clockwise or counter-clockwise rotation of the rotor 12 so as to bring non-magnetized permanent magnet pairs in proximity to the coil packs 26, which allows magnetization of the remaining permanent magnets 14.

While the racetrack coils 22 in accordance with FIG. 1 may be generally applicable to the magnetization of rotors, it should be noted that as the size of the rotor 12 increases, the required volume of the magnetic field produced by each of the racetrack coils 22 must also increase so as to provide sufficient magnetization of the permanent magnets 14. However, as noted above, it can be very difficult for conventional resistive magnetizers to produce such fields.

Figure 2:
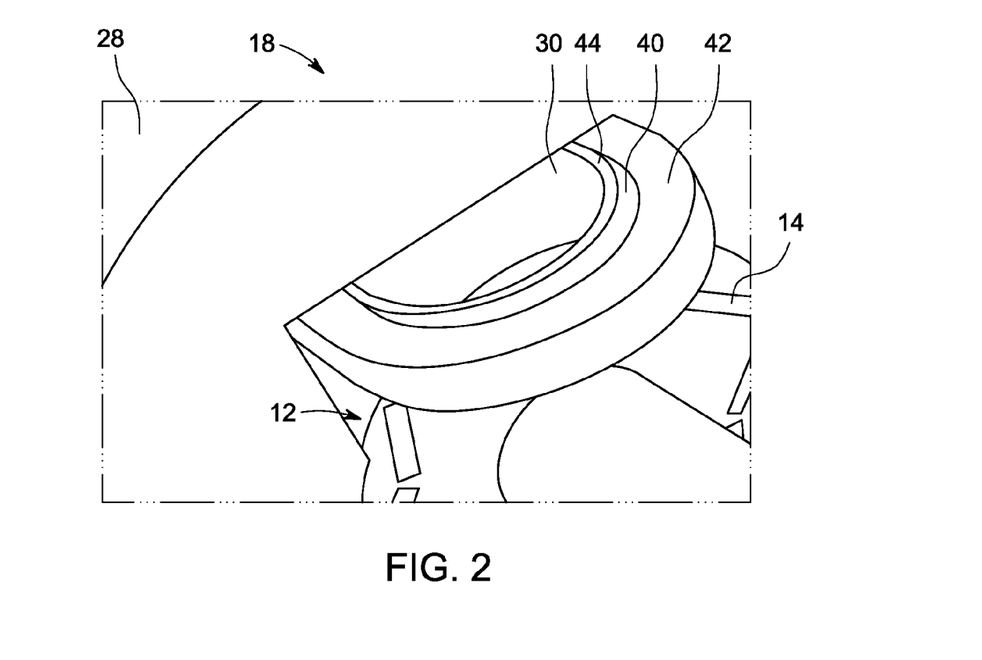
FIG. 2 is an embodiment of a coil configuration for the superconducting coils of FIG. 1, the coil configuration including a non-conductive end spacer configured to reduce the peak field at the coil.

For example, in embodiments where the diameter of the rotor 12 is on the order of 0.1 m and above, the racetrack coils 22, in a simple wound configuration, may not be sufficient to provide sufficient magnetic field saturation of the permanent magnets 14. Accordingly, it may be desirable to manipulate the magnetic field produced by the coils 22 to as to provide more efficient magnetization. In accordance with the present disclosure, one approach, which is illustrated in FIG. 2, is to increase saturation by the racetrack coils 22 to reduce and move the peak magnetic field produced by the racetrack coils 22 from an end winding section 32 of the coils 22 to a long section 34 of the coils 22, the sections being more clearly illustrated in the inset of FIG. 1. Other approaches may include shaping the cryostat 24 so as to bring the racetrack coils 22 in closer proximity with the rotor 12, modifying the placement of or removing the yoke 28 to improve the magnetic field circuit, using multiple superconducting materials for the coils 22, or any combination thereof. Such embodiments are described in further detail with respect to FIGS. 3-18 below.

Therefore, keeping in mind the general characteristics of the assembly 10 of FIG. 1, an embodiment of the approach of moving the peak field produced by the coils 22 is illustrated in FIG. 2. Specifically, FIG. 2 is a diagrammatic illustration of one of the racetrack coils 22 having a non-conductive end spacer 40 disposed between an outer coil 42 and an inner coil 44 of the windings of the coils 22. Generally, the outer coil 42 is disposed about the inner coil 44, and the superconducting magnet materials that form each of the coils may be the same, or may be different, as will be discussed in detail below. In the illustrated embodiment, the outer coil 42 and the inner coil 44 include the same superconducting magnet material. When a current is passed through the inner coil 44 and/or the outer coil 42, respective first and second magnetic fields may be produced. In some embodiments, one of the coils may have a higher critical current than the other. In such embodiments, the coil having the higher critical current may produce a stronger magnetic field. Such embodiments are discussed below. It should be noted that the peak magnetic field produced by such a racetrack coil 22 may be approximately 90%, 88%, or 85% lower than the peak magnetic field of the racetrack coils of FIG. 1 with no end spacer. For example, in an embodiment, the peak field may be reduced from approximately 8.8 Tesla (T) to approximately 7.7 T. Moreover, because the peak field is now moved to the long portion 34 of the coils 22, magnetic flux is produced by a greater area of the coils 22, which may provide a greater area of saturation to magnetize the permanent magnets 14.

Figure 3:
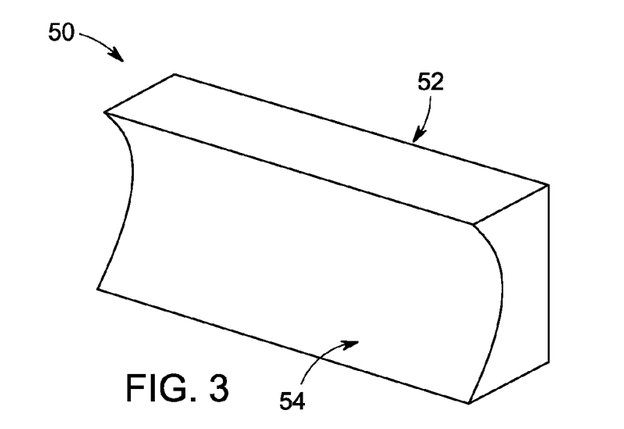
FIG. 3 is a perspective illustration of an embodiment of a curved cryostat configured to house superconducting coils, and the curved cryostat allows the coils to interface with an annular rotor so as to facilitate magnetization of permanent magnets within the rotor.

Another approach to increasing magnetic efficiency, as noted above, is to shape the cryostat 24 so as to allow the coils 22 to be in closer proximity to the rotor 12. Embodiments of such approaches are illustrated with respect to FIGS. 3-8, and may be used in lieu of, or in combination with, the embodiment illustrated in FIG. 2. Specifically, FIG. 3 depicts a cryostat 50 having a flat surface 52 that is configured to be placed against the yoke 28 or other supporting structure. The cryostat 50 also includes a curved surface 54, which may be configured to allow the coils 22 inside the cryostat 50 to be disposed radially around the circumference of the rotor 12.

Figure 4:
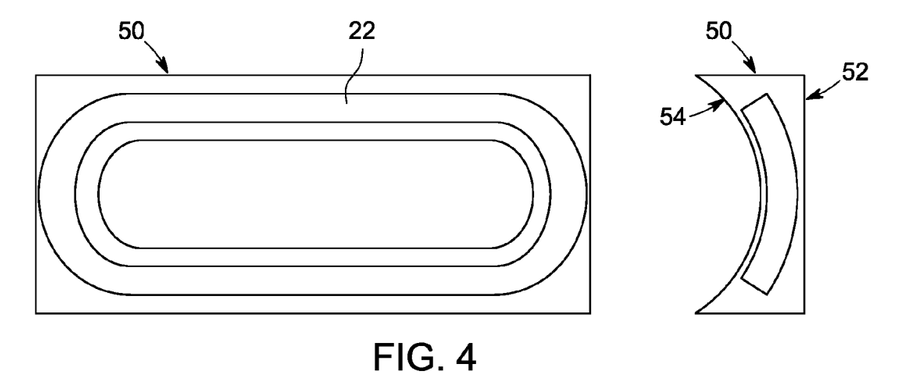
FIG. 4 is a schematic illustration of the cryostat of FIG. 3.
Figure 5:
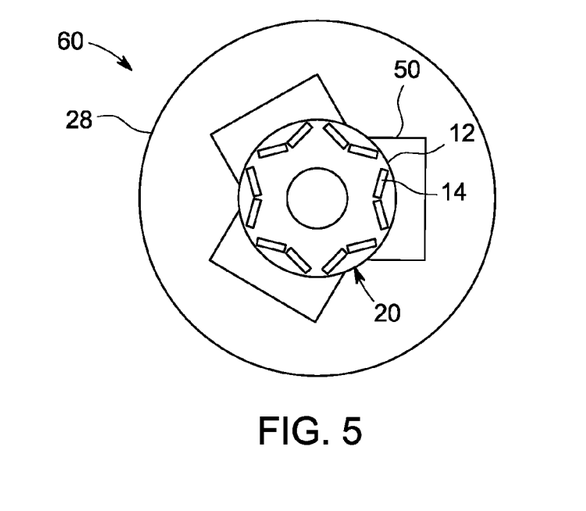
FIG. 5 is an end-on illustration of an assembly including a superconducting magnetizer assembly and a rotor disposed within the assembly, the superconducting magnetizer assembly utilizing the curved cryostat of FIGS. 3 and 4.

FIG. 4 depicts the arrangement of the coils 22, which may have constant perimeter end windings, or other winding configurations which fit closely on a cylindrical surface, so as to allow more penetration of the magnetic field into the permanent magnets 14. An assembly 60 having the superconducting magnetizer assembly 18, the rotor 12, and the curved cryostat 50 is depicted in FIG. 5. As may be appreciated, the cryostat 50 is placed against the circumferential bounds of the rotor 12 so as to allow the coils 22 to be disposed in a close-spaced relationship. It should be noted that in the embodiment depicted in FIGS. 3-5, the cryostat 50 allows the yoke 28 to be constructed from a single piece having the annular opening 20 configured to receive the rotor 12.

Figure 6:
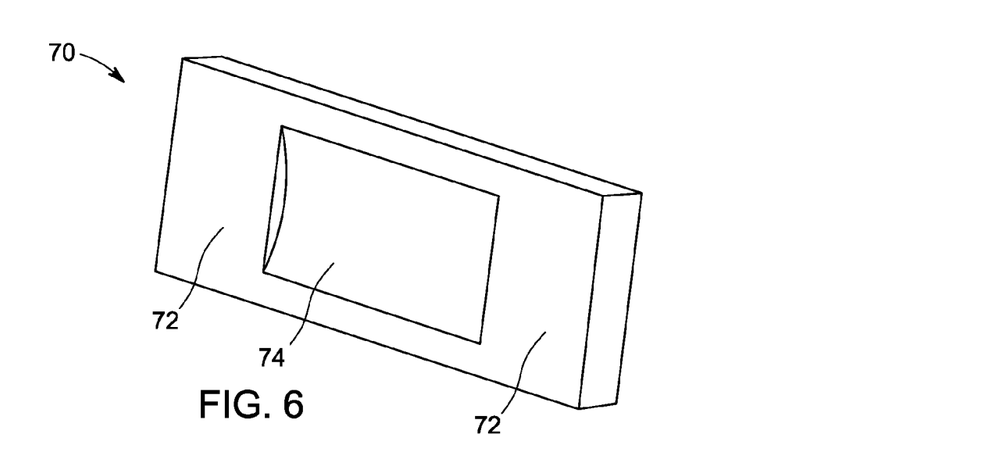
FIG. 6 is a perspective illustration of an embodiment of a dished cryostat configured to house superconducting coils, and the dished cryostat allows the coils to interface with an annular rotor so as to facilitate magnetization of permanent magnets within the rotor.
Figure 7:
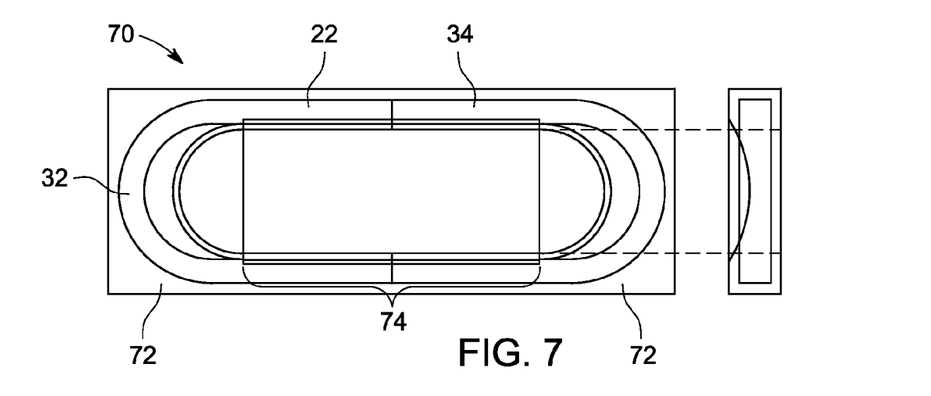
FIG. 7 is a schematic illustration of the cryostat of FIG. 6.

An embodiment of a similar approach is depicted in FIG. 6, which illustrates a dished cryostat 70 having flat surfaces 72 bounding either side of a recess 74 within the cryostat 70. The recess 74 may be considered a dish that is formed so as to receive a portion of the rotor 12 therein. The placement of the coils 22 in the dished cryostat 70 is illustrated in FIG. 7, which shows the long section of the coil 22 as being at least as long as the length of the recess 74. Moreover, the width of the end section 32 of the coil 22 is at least as large as the width of the recess 74. Such spatial relationships may allow effective magnetic field penetration into the permanent magnets 14 by the coils 22 in combination with the approach described with respect to FIG. 2.

Figure 8:
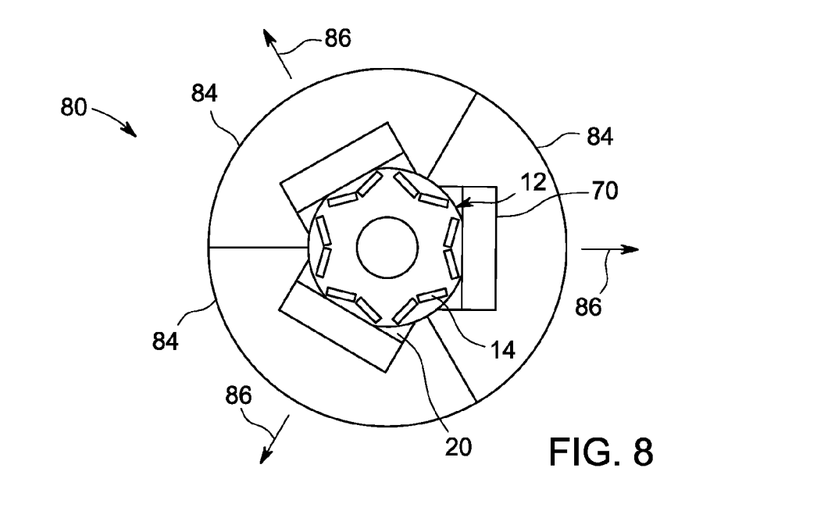
FIG. 8 is an end-on illustration of an embodiment of an assembly including a superconducting magnetizer assembly and a rotor disposed within the assembly, the superconducting magnetizer assembly utilizing the dished cryostat of FIGS. 6 and 7.

FIG. 8 depicts an embodiment of an assembly 80 using the dished cryostat 70. As illustrated, when placed over the rotor 12, each of the cryostats 70 has the flat surfaces 72 extending over the rotor 12, which is disposed within the respective recesses 74 of each of the cryostats 70. In the illustrated embodiment, the assembly 80 includes a yoke 82 formed from a plurality of sections 84. Each section 84 is configured to receive one cryostat 70 each, although in other embodiments each section 84 may include more than one cryostat 70. The yoke 82 of the assembly 80 may require such sections 84 due to the manner in which each of the cryostats 70 interface with the rotor 12. For example, each of the sections 84 may be removed and replaced in the directions depicted by arrows 86.

Figure 9:
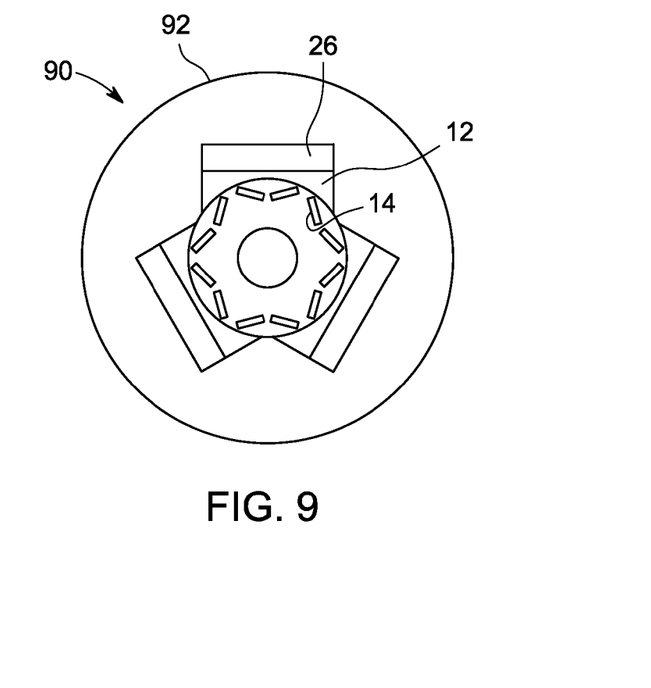
FIG. 9 is an end-on illustration of an embodiment of an assembly including a superconducting magnetizer assembly and a rotor disposed within the assembly, the superconducting magnetizer assembly utilizing an external yoke configured to enhance the field alignment within the permanent magnet material, and the superconducting magnetizer assembly is arranged to allow the magnetization of 3 poles in one operation.
Figure 10:
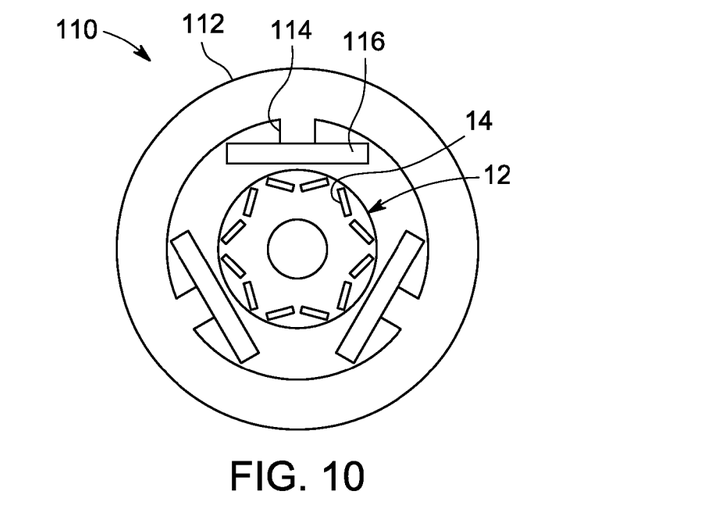
FIG. 10 is an end-on illustration of an embodiment of an assembly including a superconducting magnetizer assembly and a rotor disposed within the assembly, the superconducting magnetizer assembly utilizing a thin-profile external yoke, widened coil packs, and yoke blocks interfacing with the coil packs.
Figure 11:
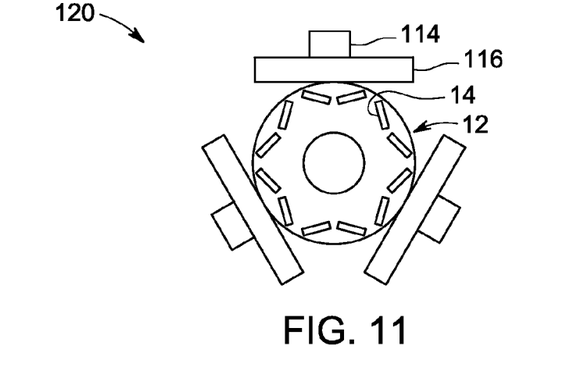
FIG. 11 is an end-on illustration of an embodiment of an assembly including a superconducting magnetizer assembly and a rotor disposed within the assembly, the superconducting magnetizer assembly not having an external yoke but having widened coil packs, and yoke blocks interfacing with the coil packs.
Figure 12:
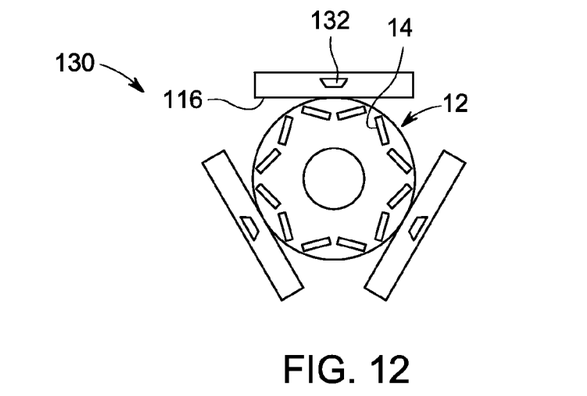
FIG. 12 is an end-on illustration of an embodiment of an assembly including a superconducting magnetizer assembly and a rotor disposed within the assembly, the superconducting magnetizer assembly not having an external yoke but having widened coil packs and an internal yoke for interfacing with the coil packs.

As noted above, another approach to improving the efficiency of the magnetization of the permanent magnets 14 is to vary the magnetic circuit by changing geometries, arrangements, and/or magnetic materials. Such embodiments are illustrated with respect to FIGS. 9-12. FIGS. 9 and 10 depict embodiments where the yoke is retained, and FIGS. 11 and 12 depict embodiments where the yoke is not present. Again, in some embodiments, certain magnetic materials may be replaced with others.

One such embodiment of an assembly 90 is depicted in FIG. 9, which has the same geometric configuration as the assembly 10 of FIG. 1. In the embodiment of FIG. 9, the assembly 10 has a yoke 92 that is constructed from permendur, which is an alloy of cobalt and iron. By replacing the iron yoke with the permendur yoke 92, the magnetizing field normal to the surface of the coil packs 26, the peak magnetic fields produced by the racetrack coils 22, and the operating margin is varied. As an example, the minimum magnetizing fields produced by the racetrack coils 22 may be increased, but the maximum magnetizing fields may be decreased. Peak magnetic field on the superconducting element may also be decreased, along with improving the operating margin of the superconductor.

In the embodiment illustrated in FIG. 10, an assembly 110 includes a permendur yoke 112 having a thinner profile than the yokes of the embodiments described above. Additionally, the yoke 112 includes a series of block protrusions 114 that are disposed proximate the center of each of a set of widened coil packs 116116. In the assembly 110, the magnetizing field normal to the surface of the coil packs 116 and the peak magnetic fields produced by the racetrack coils 22 decrease compared to assembly 100, but the operating margin increases, for example by over 25% (e.g., from an operating margin of about 15% to an operating margin of about 19%), compared to assembly 100.

As noted above, FIGS. 11 and 12 illustrate embodiments wherein the yoke is not included in the assembly. It should be noted that when no external yoke is used, other features, such as a support stand or similar structure may be included so as to balance the radial forces produced by the superconducting magnets. Specifically, FIG. 11 illustrates an assembly 120 having a similar configuration to that of the assembly 110 illustrated in FIG. 10, but not having the thin profile yoke 112. However, it will be appreciated that the permendur blocks 114 are maintained within the assembly 120, for example using other support structures. In the assembly 120, the magnetizing field normal to the surface of the coil packs 116 and the peak magnetic fields produced by the racetrack coils 22 decrease compared to assembly 110, and the operating margin increases, for example by about 5% (e.g., from an operating margin of about 19% to an operating margin of about 20%), compared to assembly 110.

FIG. 12 depicts an embodiment of an assembly 130 wherein the permendur blocks 114 of assembly 120 are removed, and a set of permendur blocks 132 are placed towards the end windings of the coil packs 116. Placing the permendur blocks 132 in such a location may reduce the peak magnetic field at the racetrack coils 22. Indeed, in the assembly 130, the magnetizing field normal to the surface of the coil packs 116 and the peak magnetic fields produced by the racetrack coils 22 decrease compared to assembly 120, with the operating margin remaining about the same as the assembly 120.

While varying the geometry and/or magnetic materials present within the superconducting magnetizer assembly may have certain advantages, it may be desirable to increase the number of magnetizing poles within the magnetic circuit. For example, by increasing the number of magnetizing poles (i.e., increasing the number of coil packs), it may be possible to decrease the total number of operations required to magnetize a rotor. Further, in having a larger number of magnetizing features, the magnetization efficiency may increase. Such embodiments are illustrated diagrammatically in FIGS. 13-15.

Figure 13:
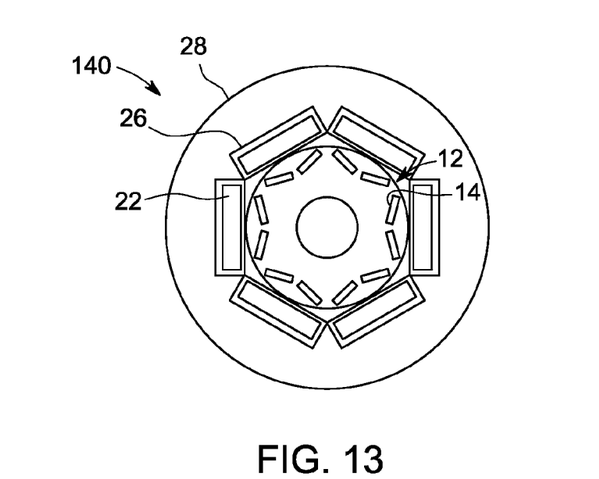
FIG. 13 is an end-on illustration of an embodiment of an assembly including a superconducting magnetizer assembly and a rotor disposed within the assembly, the superconducting magnetizer assembly having a number of superconducting magnets sufficient to magnetize all of the poles of a rotor in one operation.

Specifically, FIG. 13 illustrates an assembly 140 having six coil packs 26, each having racetrack coils 22 (with end spacers 40) so as to generate six sets of magnetic fields, one for each of the six pairs of permanent magnets 14. It will be appreciated that when magnetization is performed using the assembly 140 illustrated in FIG. 13, that only one operation may be required to fully magnetize the rotor 12. Additionally, as illustrated, the assembly 140 includes the iron yoke 28 to improve magnetization efficiency, reduce stray magnetic fields, and balance radial forces. In the assembly 140, the magnetizing field normal to the surface of the coil packs 26 and the peak magnetic fields produced by the racetrack coils 22 may be much higher compared to the assemblies described with respect to FIGS. 1 and 9-12. However, operating margin decreases greatly, for example by over 400% (e.g., from an operating margin of about 13% to an operating margin of about 3%), compared to assembly 10.

Figure 14:
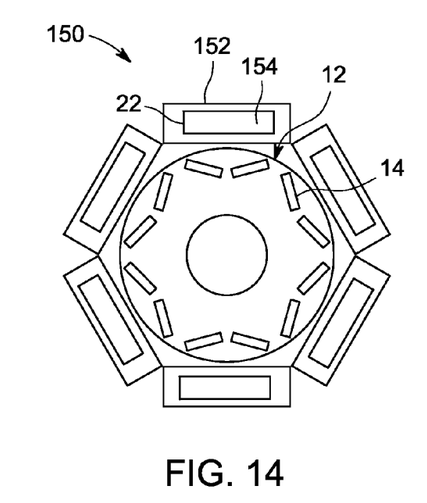
FIG. 14 is an end-on illustration of an embodiment of an assembly including a superconducting magnetizer assembly and a rotor disposed within the assembly, the superconducting magnetizer assembly having a number of superconducting magnets interfacing with internal yokes, the superconducting magnets being sufficient to magnetize all of the poles of a rotor in one operation, but without the use of an external return yoke.

FIG. 14 illustrates an assembly 150 having a series of six coil packs 152 including the coils 22 and end spacers 40 for magnetizing each pole in one operation. The assembly 150 does not have an external yoke, but includes internal iron yokes 154 that are internal to the coil packs 152 so as to improve magnetization efficiency and reduce the peak fields at each coil 22. For the assembly 150, both the magnetizing field and the peak field decrease as compared to assembly 140, with operating margin increasing when compared to the same.

Figure 15:
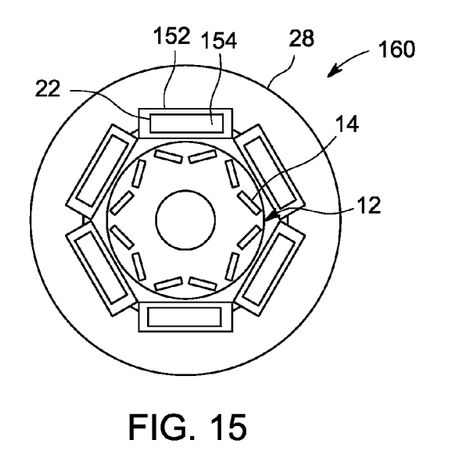
FIG. 15 is an end-on illustration of an embodiment of an assembly including a superconducting magnetizer assembly and a rotor disposed within the assembly, the superconducting magnetizer assembly having a number of superconducting magnets interfacing with internal yokes and being enclosed by an external yoke, the superconducting magnets being sufficient to magnetize all of the poles of a rotor in one operation.

FIG. 15 illustrates an embodiment of an assembly 160 having features similar to those of assemblies 140 and 150 of FIGS. 13 and 14, respectively. Specifically, assembly 160 includes the coil packs 152 having the internal iron yoke 154 so as to control peak field and improve magnetization efficiency. Additionally, the assembly 160 includes the external iron yoke 28, which may balance radial forces as well as further reduce peak fields and improve magnetization efficiency. Indeed, when compared to assembly 150, assembly 160 has increased magnetization efficiency, reduced peak field, and increased operating margin.

It should be noted that the utilization of a high field wind and react (or react and wind) superconductor, for example $Nb_3Sn$, in all of the coil packs may be prohibitive from a logistical and cost standpoint. For example, $Nb_3Sn$ coils require features to offset the forces resulting from the large electromagnetic interactions. Accordingly, it may be desirable to incorporate features into the embodiments described above so as to mitigate such concerns. One such approach is to incorporate other superconducting materials, such as niobium-titanium (NbTi), vanadium gallium ($V_3Ga$), and so forth, into the assemblies described herein. Accordingly, FIGS. 16-18 illustrate embodiments wherein at least two different types of superconducting materials are incorporated into the magnetizing assembly.

Figure 16:
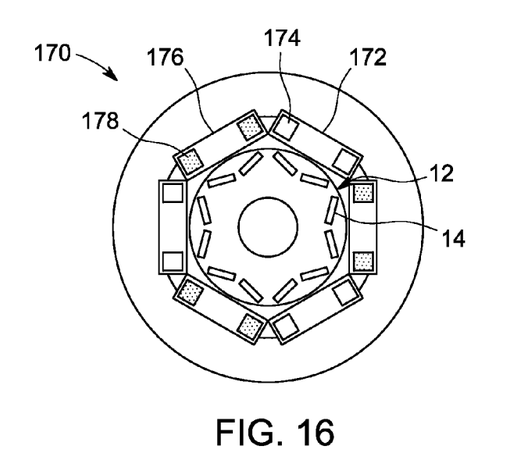
FIG. 16 is an end-on illustration of an embodiment of an assembly including a superconducting magnetizer assembly and a rotor disposed within the assembly, the superconducting magnetizer assembly having a combination of at least two different superconducting materials in the form of interleaving coil packs capable of magnetizing 3 poles in a single operation.

FIG. 16 illustrates an embodiment of an assembly 170 having $Nb_3Sn$ coil packs 172 having $Nb_3Sn$ racetrack coils 174 and end spacers 40 interleaved with NbTi coil packs 176 having NbTi racetrack coils 178. It should be noted that in order to facilitate discussion, each coil pack is illustrated as a cross-section. While the NbTi coils 178 do not perform any substantial magnetization of the permanent magnets 14 as the $Nb_3Sn$ coils 174 do, this efficiently minimizes the use of high field wind and react superconductors in the overall assembly, so that magnetic efficiencies and peak field reductions may be achieved similar to those exhibited by the embodiments illustrated in FIGS. 13-15. However, rather than being able to magnetize all of the magnetic poles in one operation as with assemblies 140, 150, and 160, two operations must be performed for the assembly 170, wherein three of the pairs of permanent magnets 14 are magnetized, followed by rotation and magnetization (i.e., re-energizing the coils).

Figure 17:
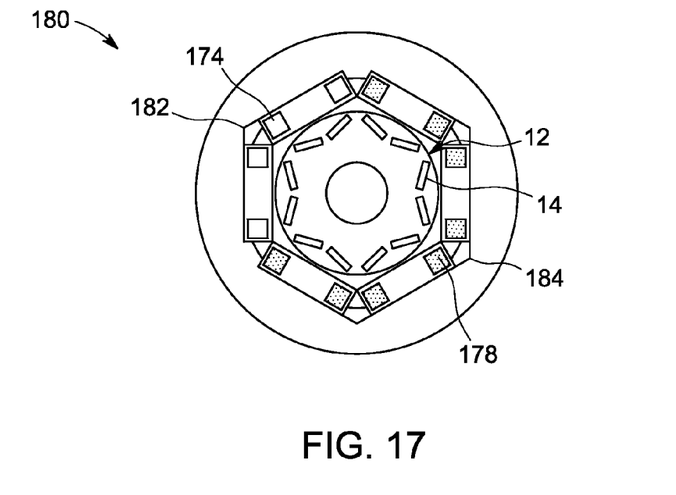
FIG. 17 is an end-on illustration of an embodiment of an assembly including a superconducting magnetizer assembly and a rotor disposed within the assembly, the superconducting magnetizer assembly having a combination of at least two different superconducting materials, one of the superconducting materials being configured to act as a main magnetization circuit to magnetize each pole in the rotor individually.
Figure 18:
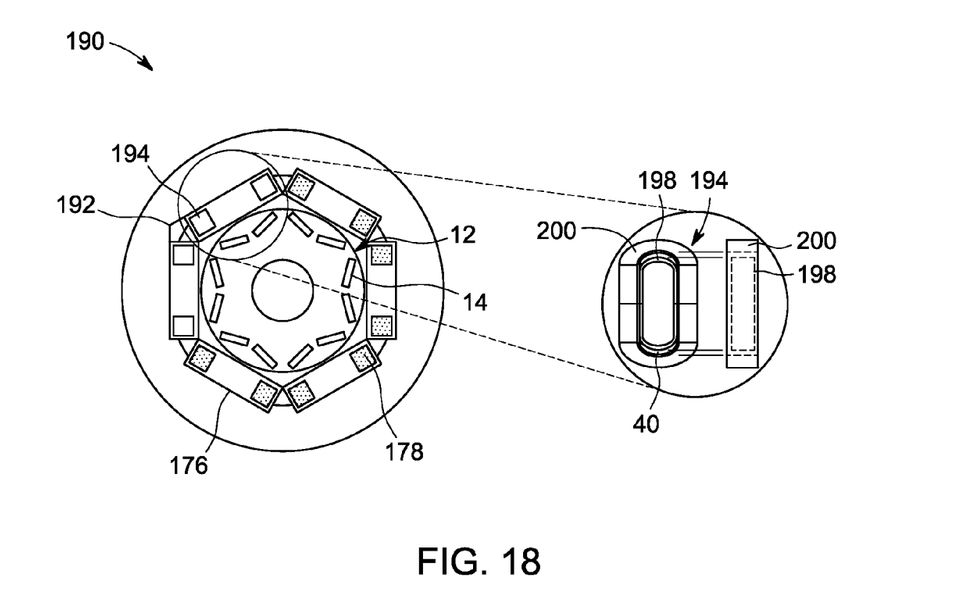
FIG. 18 is an end-on illustration of an embodiment of an assembly including a superconducting magnetizer assembly and a rotor disposed within the assembly, the superconducting magnetizer assembly having hybrid coil packs forming a main magnetization circuit and including one of the superconducting materials being disposed on an inner, high field portion of the coil pack and the other superconducting material being disposed on an outer, low field portion of the coil pack.

In another embodiment, which is illustrated as assembly 180 of FIG. 17, rather than interleaving the coils, two of the sets of $Nb_3Sn$ coils 174 may be disposed proximate one another, with the other four sets of coils being the NbTi coils 178. The assembly 180 therefore has one main magnetizing circuit, which is formed by combining the two sets of $Nb_3Sn$ coils 174 in a single cryostat 182. Because the $Nb_3Sn$ coils 174 are disposed proximate one another, the main magnetizing circuit magnetizes two pairs of the permanent magnets 14 at once. Accordingly, three operations are required to magnetize all of the permanent magnets 14 in the embodiment depicted in FIG. 17. In a similar manner to the Nb$_3$Sn coils 174, the NbTi coils 178 may be combined into a single cryostat 184. Such an arrangement is generally configured to increase the inter coil pack distance to help offset inter coil pack forces.

To further reduce the amount of Nb$_3$Sn that is utilized, it may be possible to hybridize the coils, wherein a single coil pack includes both NbTi coils and Nb$_3$Sn coils. Such an embodiment is illustrated with respect to FIG. 18. Specifically, FIG. 18 illustrates an assembly 190 having a main magnetization cryostat 192, and four separate NbTi coil packs 176 each having NbTi coils 178. The main magnetization cryostat 192 houses two hybrid coil sets 194 having both Nb$_3$Sn coils and NbTi coils. Specifically, as shown in the expansion, the Nb$_3$Sn coils are employed in the inner, high field section 198 and the NbTi are employed in the outer, lower field section 200. Such an arrangement allows the Nb$_3$Sn coils to have maximum proximity to the permanent magnets that are being magnetized, which allows for complete local magnetic saturation of two pairs of the permanent magnets 14. In the illustrated embodiment, the Nb$_3$Sn coils are stepped in to allow more volume for force containment resulting from coil interactions. Optionally, the non-conductive end spacer 40 may be used to further reduce peak fields.

Technical effects of the invention include lower running costs of the superconducting system, a smaller footprint than conventional magnetizers, and the ability to be deployed without the requirement of special facilities for operation (due to the lower power requirements). Moreover, the present embodiments lead to higher magnetization throughput than a conventional system. The embodiments describe herein may be modular, such as by using the separate coil packs described above, which allows components to be replaced as needed. Additionally, a greater percentage of magnetization of permanent magnets may allow more robust and longer lifetime magnetically-driven equipment, such as turbines, brakes, bearings, and so forth.

This written description uses examples to disclose the invention, including the best mode, and also to enable any person skilled in the art to practice the invention, including making and using any devices or systems and performing any incorporated methods. It should also be understood that the various examples disclosed herein may have features that can be combined with those of other examples or embodiments disclosed herein. That is, the present examples are presented in such as way as to simplify explanation but may also be combined one with another. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A superconducting magnetizer assembly, comprising:
a coil pack, comprising an inner coil comprising a first superconducting magnet material, the inner coil being configured to generate a first magnetic field in response to an electric current supplied to the inner coil, an outer coil comprising a second superconducting magnet material, the outer coil being disposed about the inner coil and being configured to generate a second magnetic field in response to an electric current supplied to the outer coil, a non-conductive end spacer disposed between an end winding of the inner coil and an end winding of the outer coil, and a container configured to house the inner and outer coils; and
a yoke disposed proximate the coil pack being configured to constrain the first and second magnetic fields to reduce the strength of the first field at the end winding of the inner coil, wherein the yoke comprises an annular ring configured to at least partially envelop the coil pack.

2. The assembly of claim 1, wherein the yoke comprises iron or permendur.

3. The assembly of claim 1, wherein the first superconducting magnet material and the second superconducting magnet material are the same.

4. The assembly of claim 1, wherein the first superconducting magnet material is different from the second superconducting magnet material, and the first superconducting magnet material has a higher critical current where the magnetic field is stronger than the second superconducting magnet material.

5. The assembly of claim 1, wherein the container is a cryogenic container configured to maintain the inner and the outer coils at a set temperature.

6. The assembly of claim 1, wherein the container is curved so as to radially interface substantially continuously throughout the length of the container with the surface of an annular rotor.

7. The assembly of claim 1, wherein the container comprises a curved recess bounded by flat surfaces, the curved recess being configured to radially interface with the surface of an annular rotor.

8. The assembly of claim 1, comprising additional coil packs having respective coils with superconducting magnet materials, the coils being configured to generate respective magnetic fields in response to an electrical current applied to the additional coils.

9. The assembly of claim 8, wherein the yoke is configured to receive the coil pack and the additional coil packs, the coil packs being disposed radially about an inner circumference of the yoke and forming an annular opening configured to receive a cylindrical rotor having one or more permanent magnets.

* * * * *